United States Patent [19]

Sagi

[11] Patent Number: 4,883,939

[45] Date of Patent: Nov. 28, 1989

[54] AUTOMATIC TOOL CHANGER FOR WORKPIECE PROCESSING MACHINES

[75] Inventor: Nehemia Sagi, Indianapolis, Ind.

[73] Assignee: Automatic Tool Control and Management Systems, Inc., Carmel, Ind.

[21] Appl. No.: 209,686

[22] Filed: Jun. 21, 1988

[51] Int. Cl.⁴ .............................................. B23K 9/12
[52] U.S. Cl. .................................... 219/125.1; 901/42
[58] Field of Search ............. 219/86.25, 125.1, 125.11; 901/30, 42

[56] References Cited

U.S. PATENT DOCUMENTS

| | | | |
|---|---|---|---|
| 3,722,711 | 3/1973 | Seidel | 294/97 |
| 4,046,263 | 9/1977 | Cwycyshyn et al. | 29/26 A |
| 4,132,318 | 1/1979 | Wang et al. | 294/86 R |
| 4,309,809 | 1/1982 | Yokoe et al. | 29/568 |
| 4,310,958 | 1/1982 | Balaud et al. | 29/26 A |
| 4,520,550 | 6/1985 | Dunn et al. | 29/568 |
| 4,551,903 | 11/1985 | Bisiach | 29/568 |
| 4,557,035 | 12/1985 | Rütschle et al. | 29/568 |
| 4,577,284 | 3/1986 | Christy et al. | 364/513 |
| 4,604,787 | 8/1986 | Silvers, Jr. | 414/730 |
| 4,609,326 | 9/1986 | Roesler | 414/736 |
| 4,621,409 | 11/1986 | Weixel | 29/568 |
| 4,645,901 | 2/1987 | Scholz et al. | 219/125.1 |
| 4,660,274 | 4/1987 | Goumas et al. | 29/568 |
| 4,664,588 | 5/1987 | Newell et al. | 414/730 |
| 4,706,372 | 11/1987 | Fewero et al. | 29/568 |
| 4,733,050 | 3/1988 | Grafius | 219/125.1 |
| 4,737,611 | 4/1988 | Humbolt | 219/86.25 |

OTHER PUBLICATIONS

*Applied Robotics* catalog excerpts, 1986.

EOA Systems Inc., *EOS Systems, Your Turnkey Supplier of Robot End of Arm Tooling*, 1987.
Alexander Binzel GmbH & Co, *Torch Neck Changing System*, no date.
Mecanatron, *Now! The Industry's First Automatic Quick Change Deburring System*, no date.
Mecanatron, *Mecanatron Introduces Automatic Quick Change Deburring System*, no date.

*Primary Examiner*—Clifford C. Shaw
*Attorney, Agent, or Firm*—Woodard, Emhardt, Naughton Moriarty & McNett

[57] ABSTRACT

A robot using a shielded-arc welding torch has an automatic tool change station in a small area of the work envelope. An effector adaptor is attached to the robot effector. The torch is secured to a tool adaptor. The tool adaptor body has a pair of semi-circular shells around it, with upper and lower mounting flanges on each of the shells and projecting in directions radially outward from the tool adaptor. A groove in the effector adaptor receives the upper flanges which are locked in the grooves by outward spring bias on the shells. A tool changer at the tool change station has a pair of grippers operable on the shells to squeeze them toward each other to remove the upper flanges from the effector adaptor groove, and remove the tool adaptor from the effector adaptor. A tool storage magazine has a retainer groove at each of multiple circularly-spaced tool receiving pockets. The lower flanges are biased outward into locking engagement with the retainer groove when the squeezing force of the grippers is released after deposit of the tool adaptor in the magazine. Connectors for electric, water and gas transmission are included in the adaptors, as is a set of guide and cutter assemblies for welding wire. Cutter operating jaws are provided at the tool change station.

31 Claims, 14 Drawing Sheets

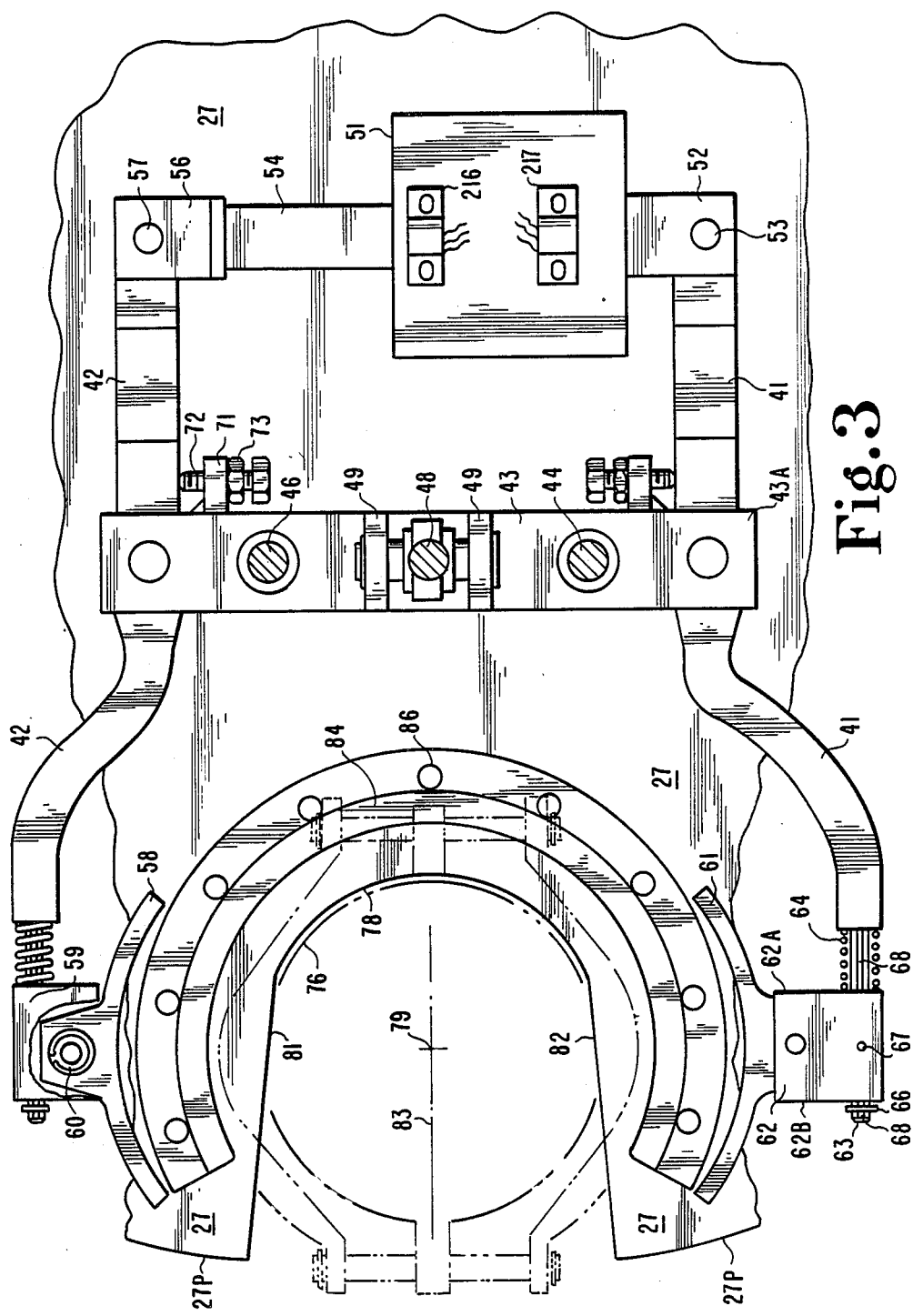

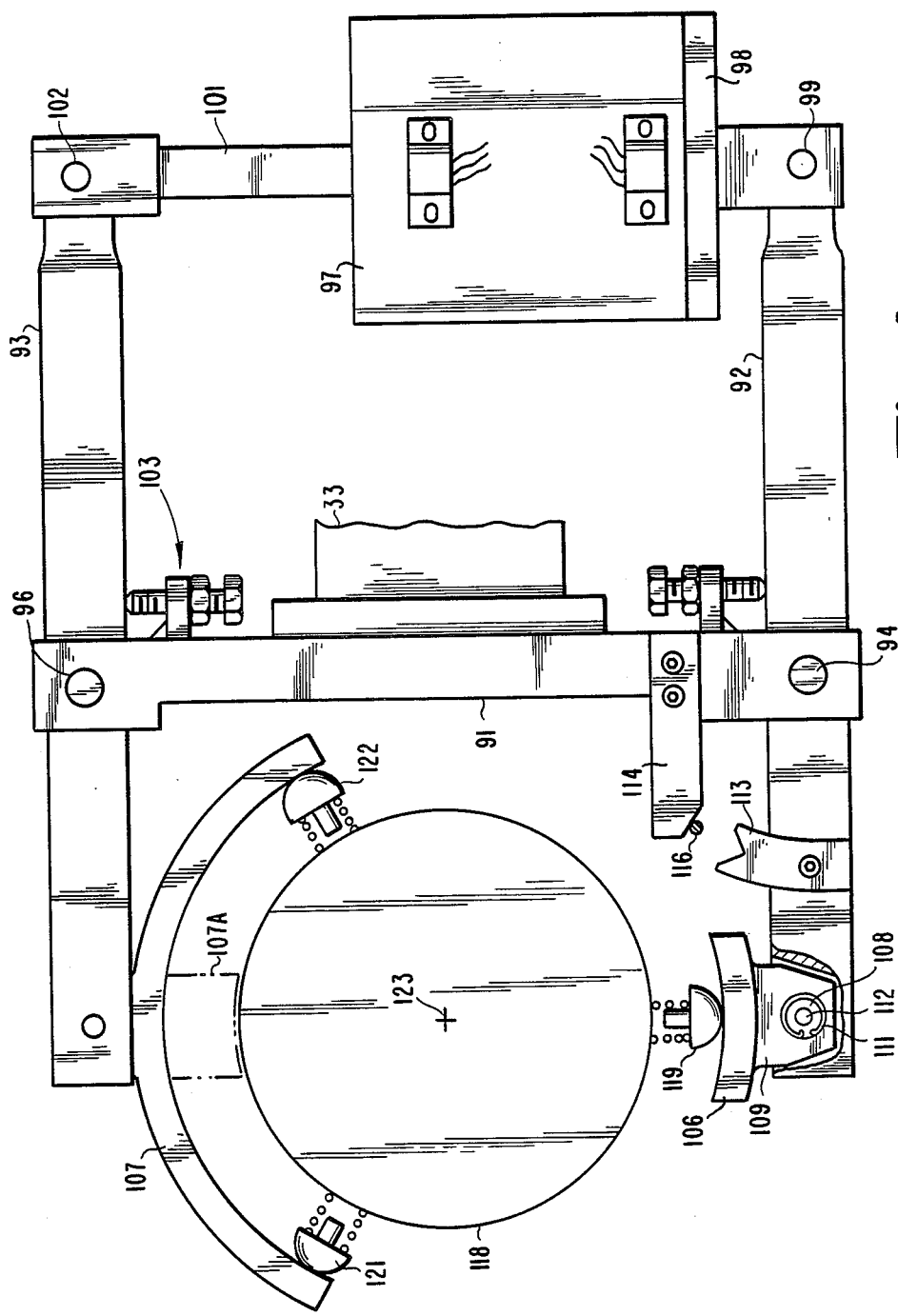

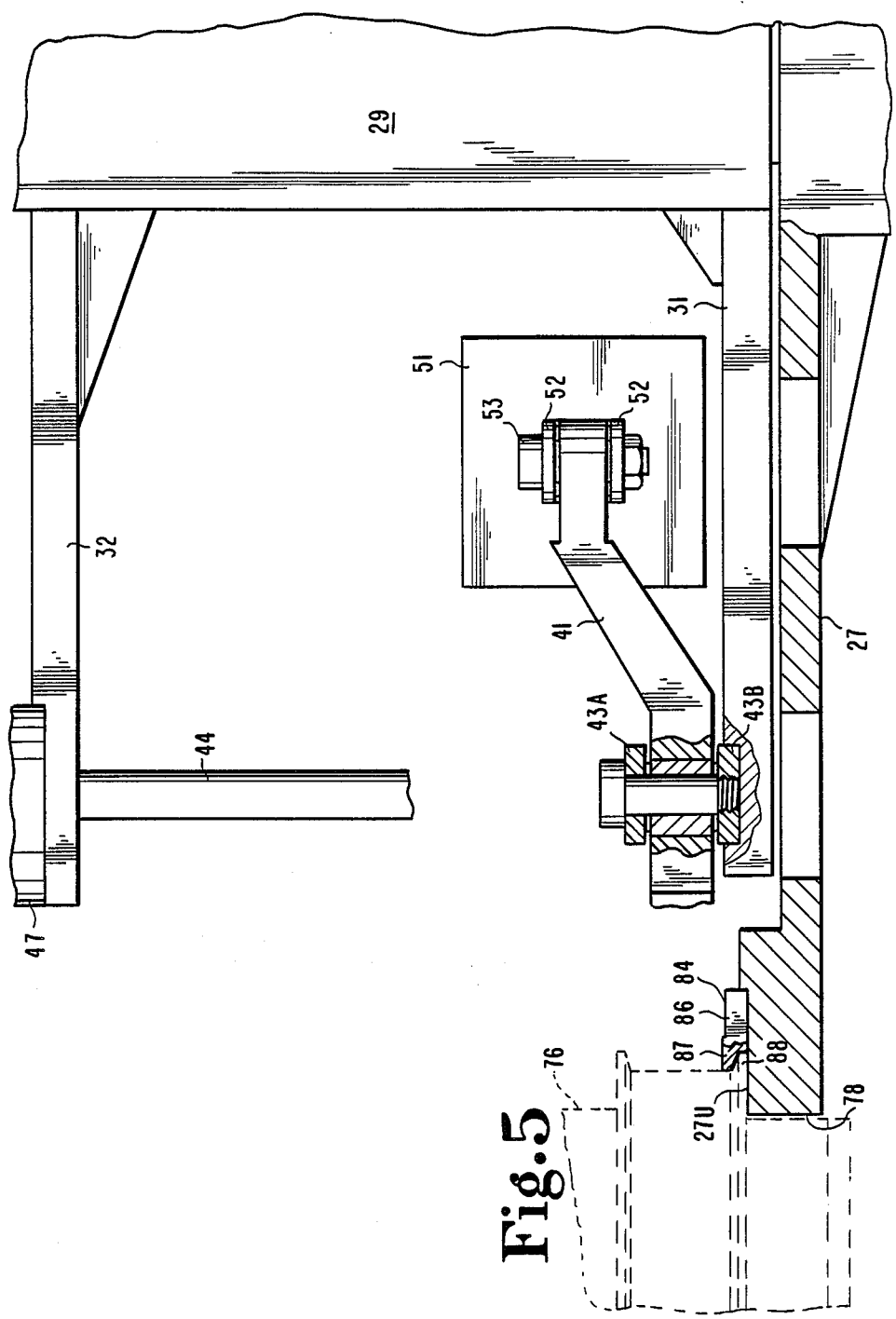

AUTOMATIC TOOL CHANGER FOR WORKPIECE PROCESSING MACHINES

TECHNICAL FIELD

This invention relates generally to machines used in industrial processes where a workpiece is machined, cut, welded, or otherwise treated. The invention is more particularly related to apparatus for automatically changing workpiece processing tools.

BACKGROUND ART

Much has been done in the creation of automatic tool changers. It is believed that most such devices are limited to single tools such as drills, milling cutters and the like for machining centers. But automatic tool changers are made for other machines including welding, cutting, deburring machines, electric discharge machines, robots, and robotic welders. One difficulty with the tool changers that currently exist, is their limited adaptability to a variety of applications. Another is the presence of the storage magazine within the work envelope of a robot. Another is the weight of tool change features that must be carried by the robot arm at all times. The present invention addresses these limitations of the prior art apparatus.

SUMMARY OF THE INVENTION

In a system for processing a workpiece with one or more processing tools and wherein a tool is mounted on an effector for causing the tool to operate on a workpiece, one embodiment of the present invention includes tool mounting apparatus including a plurality of tool adaptors, each having means thereon for receiving and securing one of the processing tools thereon. An effector adaptor has means thereon for attachment to the effector. The tool adaptor has a body that is generally symmetrical about an axis and having a pair of semi-circular shells around the body, with first and second mounting flanges mounted on the shells and projecting in directions radially outward from the tool adaptor axis and located on opposite sides of the axis. The effector adaptor has a groove receiving the flanges which are snugly engaged and locked in the grooves due to radially outward directed spring bias on the shells whereby the tool adaptor is secured to the effector adaptor.

A tool storage magazine with a plurality of tool pots is provided with a tool changer which cooperates with any one of the tool pots when the tool pot located at a designated small region (tool change station) of the work envelope of the processing system. The tool changer includes a pair of grippers operable on the shells of the tool adaptor to squeeze them toward each other against the spring bias for removal of the flanges from the effector adaptor groove, and removal of the tool adaptor from the effector adaptor.

The magazine has a retainer groove at each tool pot. The tool adaptor has two additional flanges mounted on the shells and which are biased outward into locking engagement with the retainer groove when the squeezing force of the grippers is released after deposit of the tool adaptor in the magazine. Connectors for electric, water and gas, transmission are included in the adaptors, as is a set of guide and cutter assemblies for welding wire. Cutter operating means are provided at the tool change station.

BRIEF DESCRIPTION OF DRAWINGS

FIG. 3 is an enlarged top plan view of the tool adaptor clamping mechanism.

FIG. 4 is an enlarged top plan view of the wire cutter operating mechanism.

FIG. 5 is a fragmentary elevational view on the same scale as FIG. 3, showing the tool clamping mechanism.

BEST MODE FOR CARRYING OUT THE INVENTION

Figure 1:
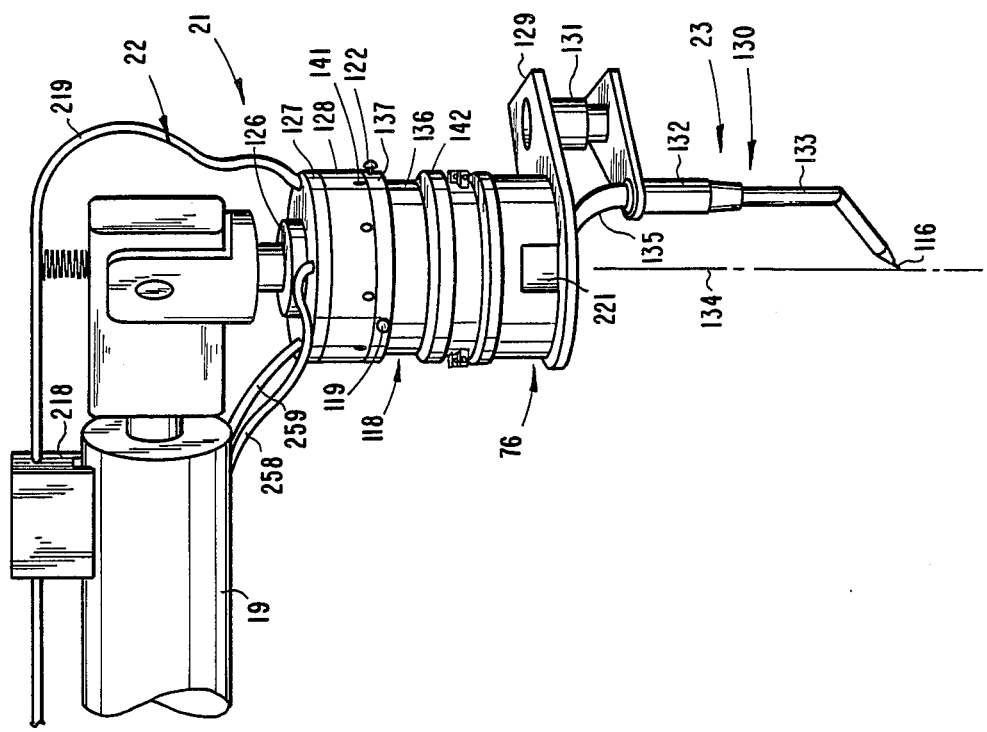
FIG. 1 is a pictorial view in somewhat schematic and fragmentary form, of a portion of a robotic processing system for workpieces and incorporating part of the tool changer apparatus according to a typical embodiment of the present invention.
Figure 2:
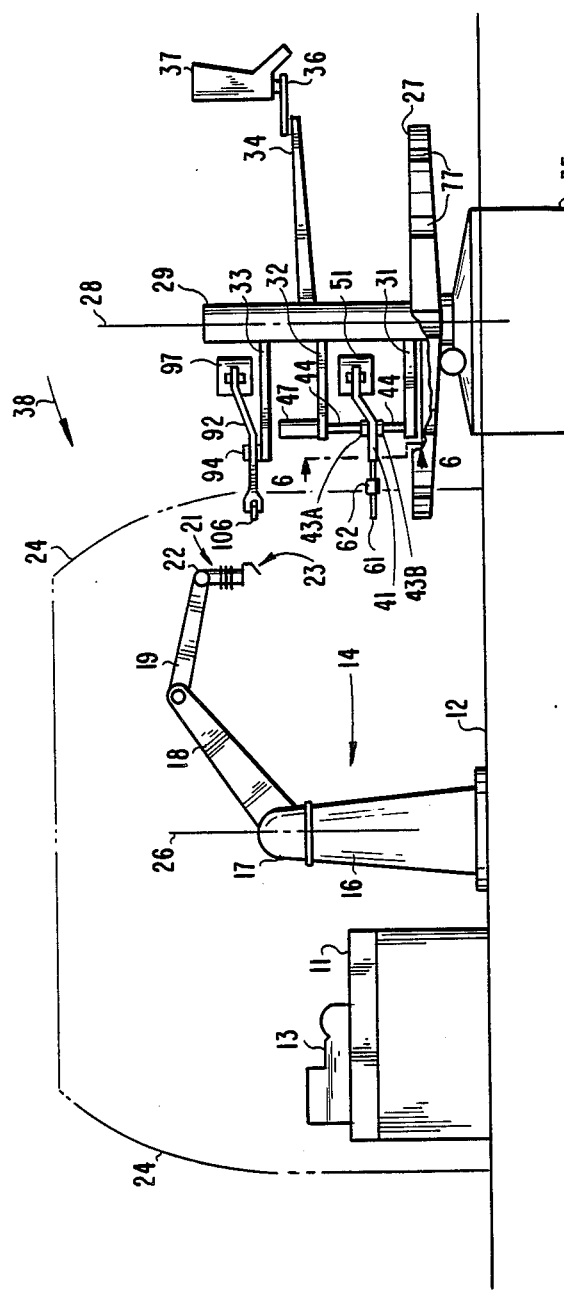
FIG. 2 is a schematic elevational view of the system on a small scale.

Referring now to the drawings in detail, particularly FIGS. 1 and 2, an example of an industrial process is represented wherein, for illustrative purposes, a conveyor or positioner 11 supported on a building floor 12 has a series of workpieces 13 (only one shown) thereon, movable by the conveyor in a direction perpendicular to the plane of the paper. A robot assembly 14 includes the pedestal 16 secured to the floor and having a head 17 capable of swiveling 270° to 300° about the top of the pedestal. Arms 18 and 19 are connected respectively to the head. An end effector assembly 21 is mounted to the distal end of arm 19 by a wrist assembly 22, and a GMAW welding torch assembly 23 is supported on the end effector assembly. The robot is capable of operating the torch assembly through a work envelope (shown by dashed line 24) having the configuration shown in FIG. 2 and 2A and occupying a volume of 270° to 300° around the robot head swivel axis 26. The conveyor or positioner 11 extends through this work envelope where the processing of the workpiece by this robot assembly is done.

A tool holder magazine 27 is mounted for rotation about a vertical axis 28 on a tool magazine drive housing 29. This housing not only supports the tool magazine 27 and its drive apparatus, but also supports a tool clamping mechanism and a wire cutter mechanism according to the present invention. The tool clamping mechanism is supported by lower and upper brackets 31 and 32, respectively, which are welded to the housing 29. The cutter mechanism is supported on bracket 33 which is welded to the housing.

The illustration of the magazine 27 in a horizontal plane, and it being operable about a vertical axis 28, is for convenience of illustration and description herein. In practice, the tool magazine and changer mechanism can be disposed witht he rotational axis of the magazine at virtually any desired attitude most appropriate for the particular work processing, tooling, and robot to be employed. In fact, the system of the present invention is not limited to application to robot processing systems, but also may be used with XYZ automatic welding equipment, machining centers, and other workpiece processing systems where there are advantages to automatic tool changing. In addition, many aspects of the present invention will be found to be applicable to systems wherein the tool storage is accomplished in a conveyor loop, a shuttle storage arrangement, or some arrangement other than the particular rotating turret type of magazine illustrated herein.

The illustrated housing 29 may be used to support bracket 34 and pivoting arm 36, if desired, to support an operator's terminal 37 which may include a screen, keyboard, removable software or data media and whatever else is desired for control and management of the robot and the tool changing operation. A control box 35 may be located under the magazine, if desired. This is on the operator's side of the tool changer, as distinguished from the robot side of the tool changer. Some applications of the robot would make it appropriate to orient the magazine (and associated tool changer and wire cutter mechanisms) so that rotational axis 28 would be tilted to some extent in the direction of arrow 38 (FIG. 2). The operator's side of the magazine would still remain on the side opposite that of the robot. Accordingly, the operator can always remain in a position, with respect to the magazine, which is out of danger from the robot itself so that the operator can load and unload tools manually from the magazine for maintenance or replacement, without personal risk.

Figure 6:
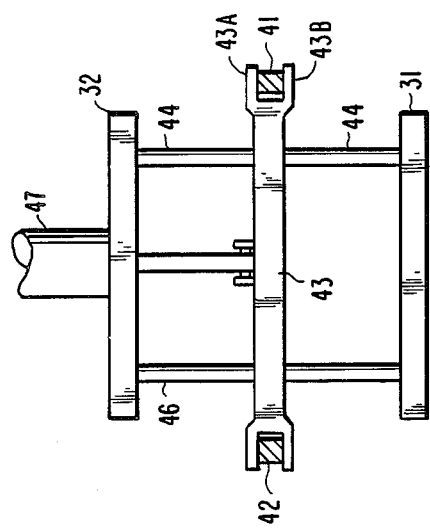
FIG. 6 is an elevational view on a scale intermediate that of FIG. 2 and FIG. 5, and showing the tool clamp elevator mechanism.

Referring now to FIG. 3 along with FIG. 2, the tool clamping mechanism is shown in greater detail. Its purpose is to be able to grip a tool holder-adaptor (hereinafter "tool adaptor"), and remove it from the magazine and hold it for insertion into the end effector assembly. It is capable of a squeezing function on the tool adaptor. This is accomplished by the use of a pair of arms 41 and 42 pivotally mounted in yokes (43A, 43B, for example) at the end of an elevator housing bar 43 which is vertically slidable on guide rods 44 and 46 (FIG. 6) whose lower and upper ends are affixed respectively in brackets 31 and 32. An actuator, which may be a pneumatic cylinder 47, for example, is secured in the upper bracket 32 and has its piston rod 48 pinned in the yoke 49 on top of the elevator bar 43, to drive the elevator bar up and down for a purpose to be described hereinafter.

An actuator 51 of suitable type, which also may be pneumatic, for example, has a yoke 52 affixed to its housing and pivotally connected at bushing assembly 53 to an end of arm 41. Where it is pneumatic, the piston rod 54 of actuator 51 has a yoke 56 at its end pivotally connected at bushing assembly 57 to the arm 42. A gripper jaw 58 is pivotally mounted in a yoke 59 by means of spherical bearing assembly 60 at the other end of arm 42. A like gripper jaw 61 is likewise pivotally mounted in a yoke 62 which is slidably mounted on a rod 63 fixed in arm 41. A compression spring 64 is mounted between the end of the arm 41 and one face 62A of the yoke 62. A stop ring 66 secured in a groove in the rod 63 is normally slightly spaced from the face 62B of the yoke 62. A pin 67 in the yoke 62 is received in a longitudinal groove 68 in the rod 63 to prevent swiveling of the yoke 62 on the rod. The yoke 59 is mounted to arm 42 in the same way. A limited amount of swiveling aciton, for compliance and centering, is provided between the gripper jaws 58 and 61 and their respective mounting yokes 59 and 62.

Adjustable limit stops are provided on the elevator bar 43 to limit the range of outer swinging motion of the gripper mounting yokes in response to action of the actuator 51. The stops are identical. The one for arm 42 includes the threaded boss 71 welded to bar 43. The stop screw 72 is threaded into the boss and the position is locked by jam nut 73. An identical assembly is used at the opposite end of the bar 43 to limit the motion of arm 41.

Figure 2A:
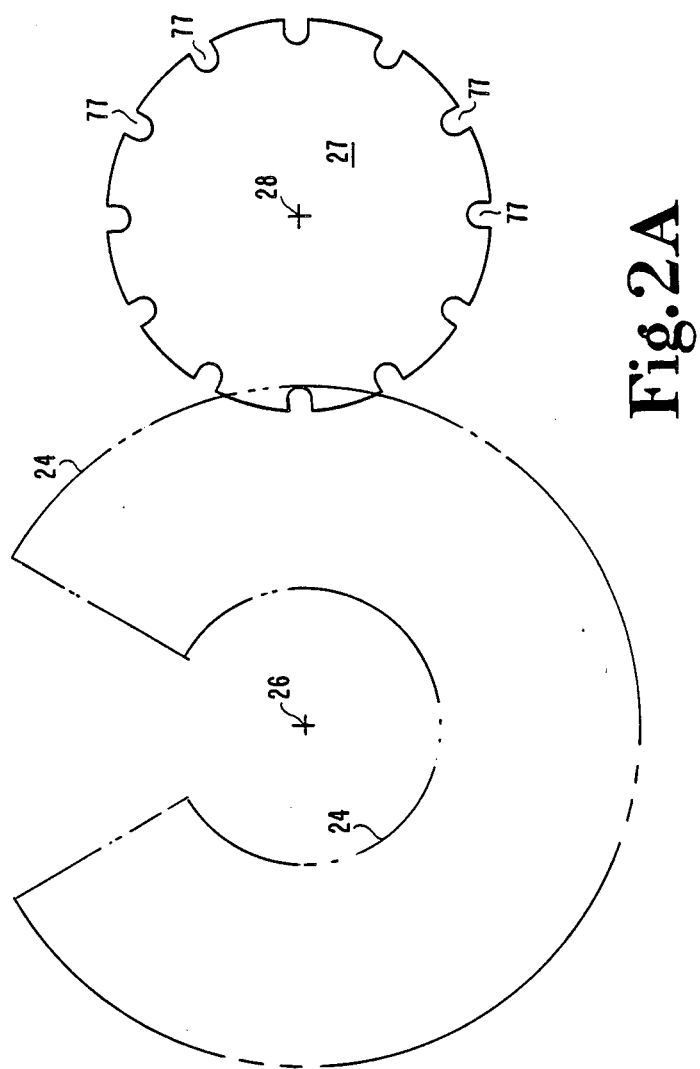
FIG. 2A is a schematic top plan view of part of the system.

FIGS. 3 and 5 show in dotted lines, a tool adaptor 76 which will be described in more detail later on. For the present, suffice it to say that the tool holder magazine 27 includes a plurality of tool pots 77 spaced around the periphery thereof and adapted to receive the tool adaptors to be used with the robot (FIG. 2A). The tool pot shown in FIGS. 3 and 5 has a cylindrical wall 78 centered on axis 79 and extending to a pair of entry walls 81 and 82, each of which extends outward at a 6° angle, for example, with respect to the plane 83 containing the central axis of the tool pot. These walls extend out to the periphery 27P of the magazine 27. A holding ring 84 which is centered on the tool pot vertical axis 79 and extends around it for approximately 240°, is fastened to the magazine 27 by a series of circularly spaced screws 86. This ring is shaped to have an internal flange 87 cnetered on the axis 79 and cooperating with the upper face 27U of the magazine 27 to provide a receiver groove 88 to receive a locking flange of the tool adaptor. The gripper jaws 58 and 61 operate on the tool adaptor to release from the grove 88 some flanges on the tool adaptor in a manner to be described.

Now that the tool adaptor gripper assembly has been generally described, and referring again to FIG. 2, the cutter assembly mounted on cutter support bracket 33 will now be described with additional reference to FIG. 4. The cutter support bracket 33 is secured to the tool magazine drive housing 29. A cutter arm support bar 91 is welded to the outer end of bracket 33. Cutter operating arms 92 and 93 are pivotally mounted in yokes at the opposite ends of the cutter arm support bar 91 by shoulder bolts 94 and 96, in the same manner as the gripper arm 41 is mounted to the elevator bar 43 shown in FIG. 5.

A pneumatic actuator assembly 97 has its housing 98 pivotally connected to one end of arm 92 at 99. The piston rod 101 of the actuator is pivotally connected to arm 93 at 102. The connections are through bushings as mentioned above for the gripper arm actuator 51. The travel of arms 92 and 93 is limited by adjustable stop assemblies 103 in the same manner as described avbove with respect to the gripper arm stops in FIG. 3.

Pushing jaws 106 and 107 are swivel mounted in yokes at the outer ends of the arms 92 and 93, respectively as in FIG. 3. The swivel mountings are achieved by spherical bearing assemblies whose outer race, as at 108, is secured in a pocket in the projection 109 of jaw 106 and retained by a snap ring 111. The hinge pins 112 of these swivel bearing assemblies are secured in the ends of the arms 92 and 93. The spherical bearing assemblies provide a certain amount of swiveling capability of the jaws for centering and compliance, but the clearances between the jaw mounting tabs 109 and the mounting yokes at the ends of the arms 92 and 93 will be such as to limit the amount of swiveling possible, so that the jaws will remain properly postured for the wire cutting function to be described hereinafter. This technique is also used in the swivel mountings of the grippers 58 and 61 in FIG. 3. The particular wire cutting function mentioned here is distinct from another wire cutting function which is performed by a wire positioning die 113 fastened to arm 92, and a wire cutting die 114 fastened to the support bar 91. These dies cooperate during closure of arm 92 when a welding wire 116 is in position between these dies, to sever fromt he welding wire, the ball which typically forms at the end of it after a welding operation. Removal of the ball facilitates removal of the wire from a tool adaptor.

An effector adaptor 118 (sometimes referred to as "robotic adaptor") and three wire cutter plunger heads 119, 121 and 122 are shown schematically in FIG. 4, all symmetrical about the center 123. This center is preferably, but not necessarily, on the upward projection of the axis 79 of the tool pot shown in FIG. 3. This particular axis should be considered the center of the tool change station and, as shown in FIGS. 2 and 2A, it is located just inside the work envelope 24 of the robot. Virtually all of the tool changing apparatus and the tool magazine are located entirely outside the work envelope, according to one feature of this invention.

Referring now to some features shown generally in FIG. 1, the end effector assembly includes an end effector face plate 126 fixed to the end of the wrist assembly. An electrical isolator 127 of a phenolic, for example, is secured to the end effector face plate. A connector tube 128 may be mounted to the bottom of the isolator. The effector adaptor 118 of the present invention is secured to the bottom of the connecting tube. All of these connections are achievable in conventional fashion by screws and bolts. The tool adaptor 76 is constructed and mounted to the robotic adaptor in a particular way according to the present invention. A tool holder plate 129 is fastened to the bottom of the tool adaptor by screws. A welding torch assembly 130 is mounted to the tool holder plate in any suitable conventional manner and includes the docking body 132, goose neck 133, and a tip. In this illustration, the mounting of the torch assembly 130 to plate 129 is done through a normally-open, break-away switch assembly 131. The welding wire 116 extends out the welding tip, with the end of the welding wire being preferably located on the center line 134 of the end effector face plate 126. It is the lower surface of the end effector face plate, and its center line, whicha re preferably used for reference purposes in controlling robots. A tube 135 contains, electrical, shielding gas and cooling water lines. It also contains a rigid tube properly curved for directing a conventional spring liner for welding wire 116 from the tool adaptor to the welding tip.

Figure 8:
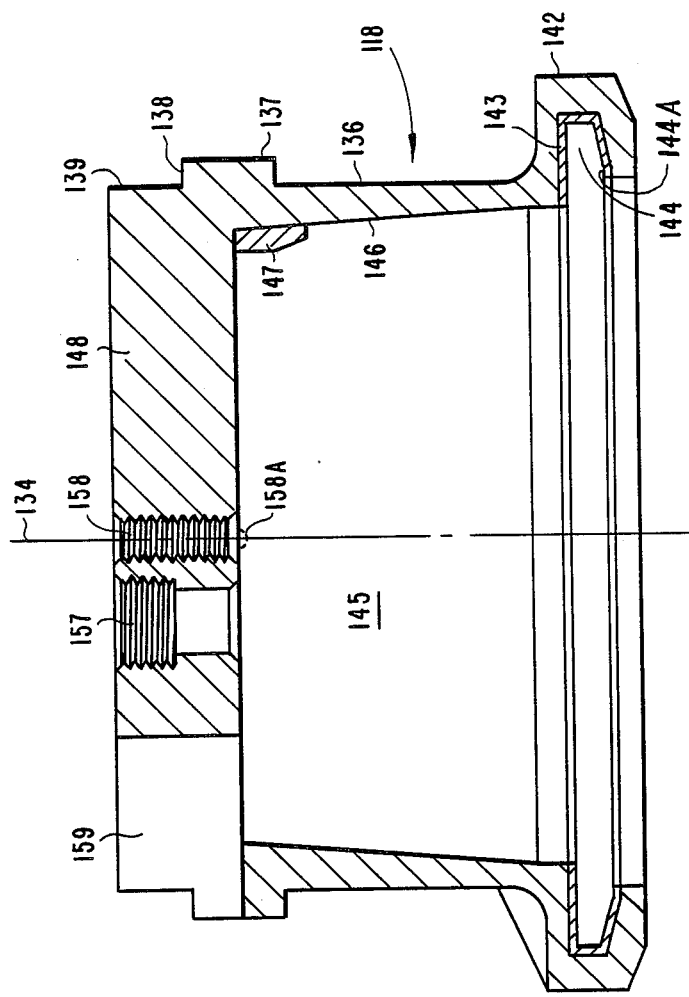
FIG. 8 is a longitudinal sectional view through the effector adaptor piece taken at line 8—8 in FIG. 7 and viewed in the direction of the arrows.

Referring now to FIG. 8, which is a longitudinal section through the robotic adaptor 118, without the connector fittings and wire cutters installed yet, the adaptor has a cylindrical body 136 which steps outward at the cylindrical flange 137 and steps inward to its original diameter at the shoulder 138, with the uper portion 139 of the body fittingly received in the connecting tube 128 of FIG. 1 in which it may be secured by a plurality of radially inward directed set screws 141 (FIG. 1), and a locating pin, for example.

The robotic adaptor has an external flange 142 at its lower end and which has an internal groove receiving a hard, wear resistant liner 143 providing an internally facing grovoe 144. The large internal cavity 145 of the robotic adaptor provides a socket for reception of the tool adaptors. It has a receiver wall 146 which is conical, being inclined at approximately 4° each side of the axis 134. Guide keys 147 are provided at two locations about 150 degrees apart on this wall as shown in the bottom view of FIG. 7. They project down from the bottom surface of the top 148 of the socket provided by this robotic adaptor.

Figure 7:
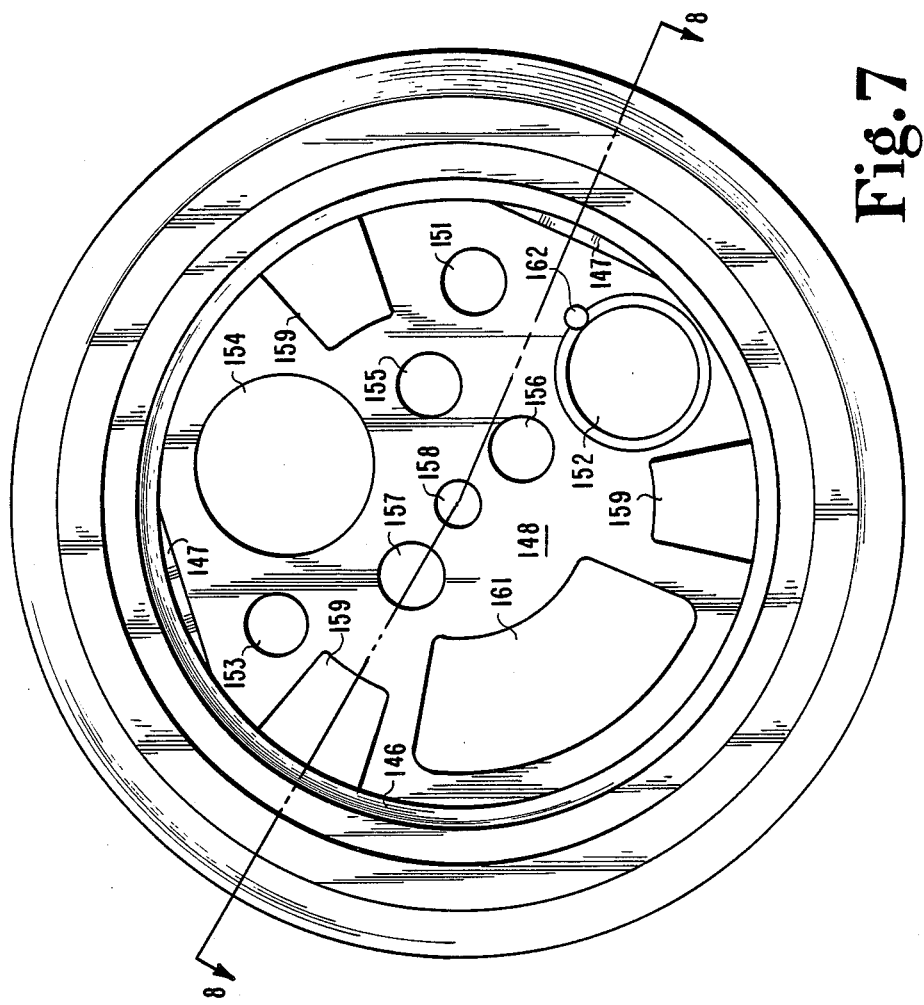
FIG. 7 is a bottom view of the effector adaptor piece.

Referring further to FIG. 7, several fitting apertures are provided as shown. Fitting aperture 151 is for a fluid line which can be a gas line or a water return line. Aperture 152 is for a three or five pin, high current connector. Aperture 153, like 151, is for a fluid line. Aperture 154 is for cooling supply water and current supply for welding. Apertures 155, 156 and 157 are for fluid lines, as are apertures 151 and 153, and are identical. This makes is possible to use the same types of fittings in several apertures, if desired. Aperture 158 is for a "tool-in-place" sensor fitting. Wire cutter assemblies are located at each of the three lcoations 159. The aperture 161 is for a multi-pin (16 pin, for example) low-current connector fitting. A hole 162 through the top 148 at aperture 152 is provided for an anti-turn and fitting retainer spring pin for the electrical fitting at aperture 152.

Figure 12:
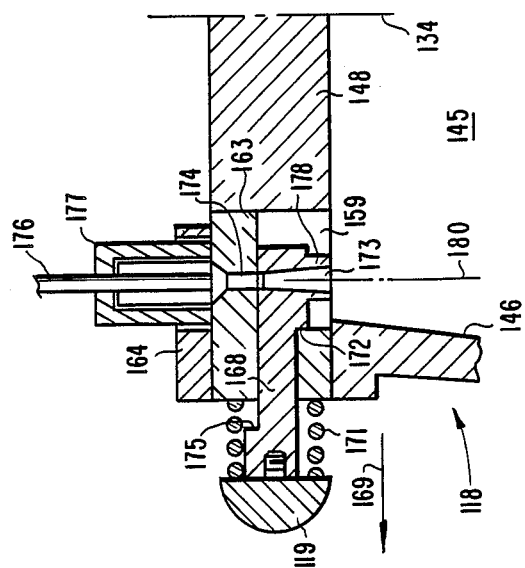
FIG. 12 is a sectional view therethrough taken at line 12—12 in FIG. 11 and viewed in the direction of the arrows.
Figure 11:
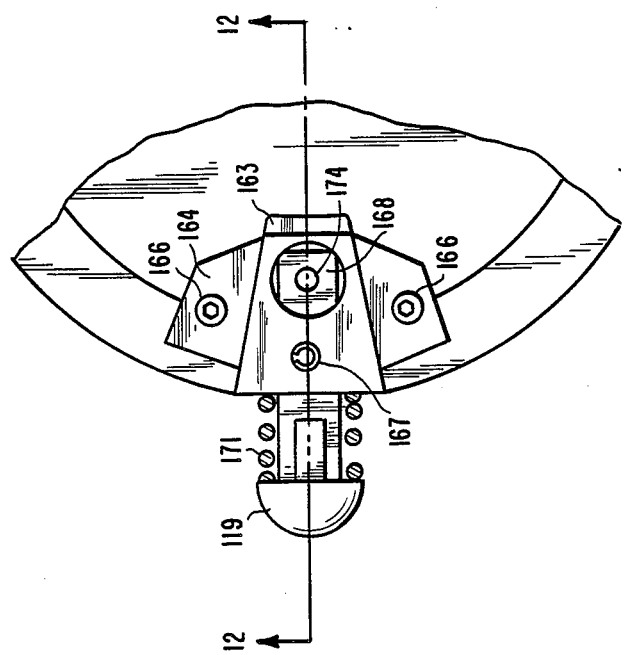
FIG. 11 is a fragmentary axial view of the effector adaptor viewed axially but showing one of the three wire feeder and cutter assemblies.

Referring now to FIGS. 11 and 12, the details of the welding wire feeder and cutter assembly are shown mounted in the effector adaptor which is shown fragmentarily, and a couple of additional parts 176 and 177 are shown in FIG. 12 that do not appear in FIG. 11. A matrics body 163 is placed in one of the openings 159 in the top of the adaptor. It is secured in place by a top cover 164 which is fastened to the top of the adaptor by cap screws 166. Since the matrics body has a trapezoidal shape when viewed from above, and fits in the mating opening in the top of the adaptor 118, it is confined against circular movement about the axis 134 of the adaptor. It is prevented from radial movement outward by the spring pin 167 extending through the cover 164 and into a hole in the matrics 163.

The wire shearing cutter die is at the inner end of a slide or plunger 168 which is normally biased in the radially outward direction of arrow 169 by a spring 171. A stop shoulder 172 on the slide, engaging wall 163A of the matrics 163 limits the outward travel of the slide. The inner shoulder of the plunger operating button 119 which is screwed into the end of the slide, serves as the outer seat for the spring 171. The stop 172 limits the outward travel of the slide so that the wire passage aperture 173 therein has its axis aligned perfectly with the axis of the aperture 174 in the matrics 163. A step 175 on the slide can abut the outer face of the matrics 163 and limits inward movement of the slide. The flexible wire guide ("liner") 176 for the welding wire 116 is attached to a liner mounting adaptor 177 which is secured to the top cover 164 in any suitable way to feed wire from the liner 176 through the aperture 174 in the matrics die and the aperture 173 in the slide and down into the cavity 145 of the effector adaptor 118. A cylindrical boss 178 projects down from the cutter slide inboard of the stop shoulder 172 and concentric with the wire entrance axis 180 of the apertures 173 and 174 in the slide and matrics, respectively. Projecting down as it does, this boss fits into a guide 178A (FIG. 9) in the wire feed assembly of the tool adaptor to be described. Normally, parts 163, 164 and 168 would be made of hardened tool steel.

There are three of these wire feeder and cutter assemblies circularly spaced on the upper protion of the robotic adaptor as mentioned above and shown schematically in FIG. 4. They are identical in nature. Two of them may be used to feed one size of wire which is either the smaller wire or the wire most quickly consumed, while the other may be used to feed a larger wire. Normally, only one would be feeding wire at a time to a single torch. The others are for a redundant supply or the supply of a different wire size or different metallurgical composition, and their use can be quickly and conveniently initiated.

Figure 9:
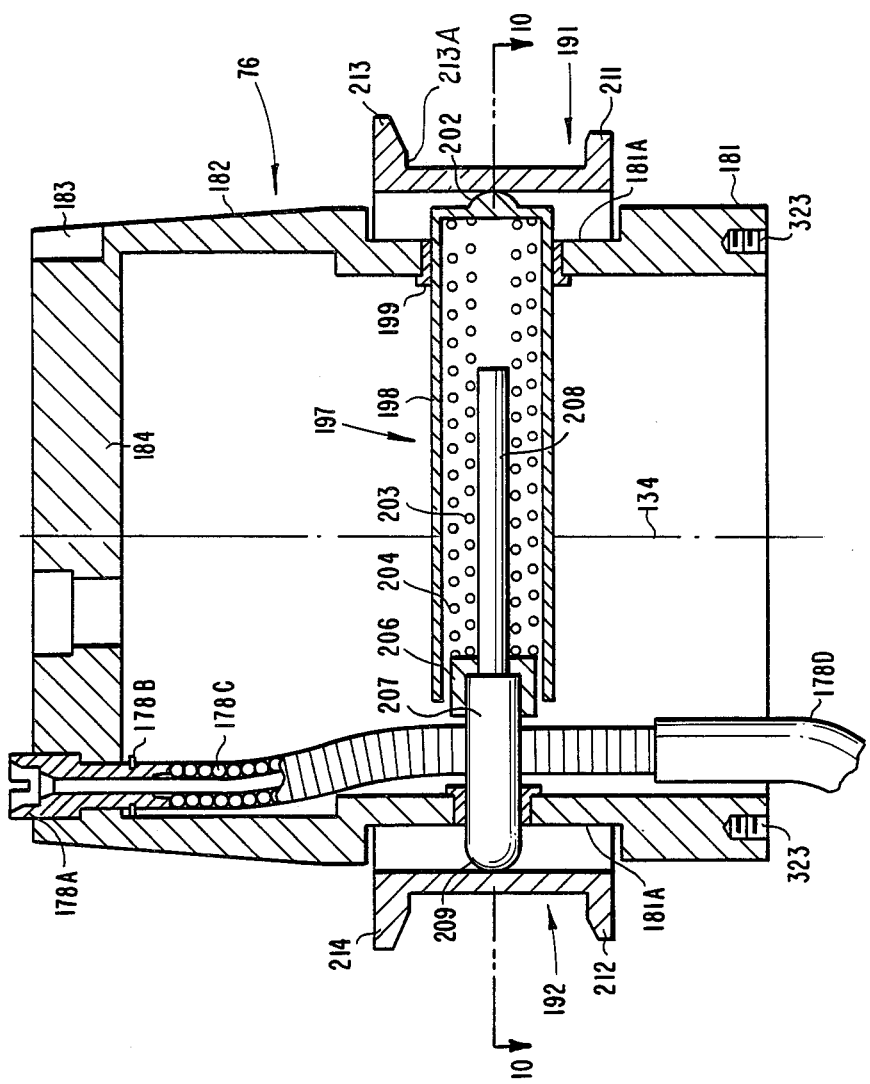
FIG. 9 is a longitudinal sectional view of the tool adaptor piece.
Figure 10:
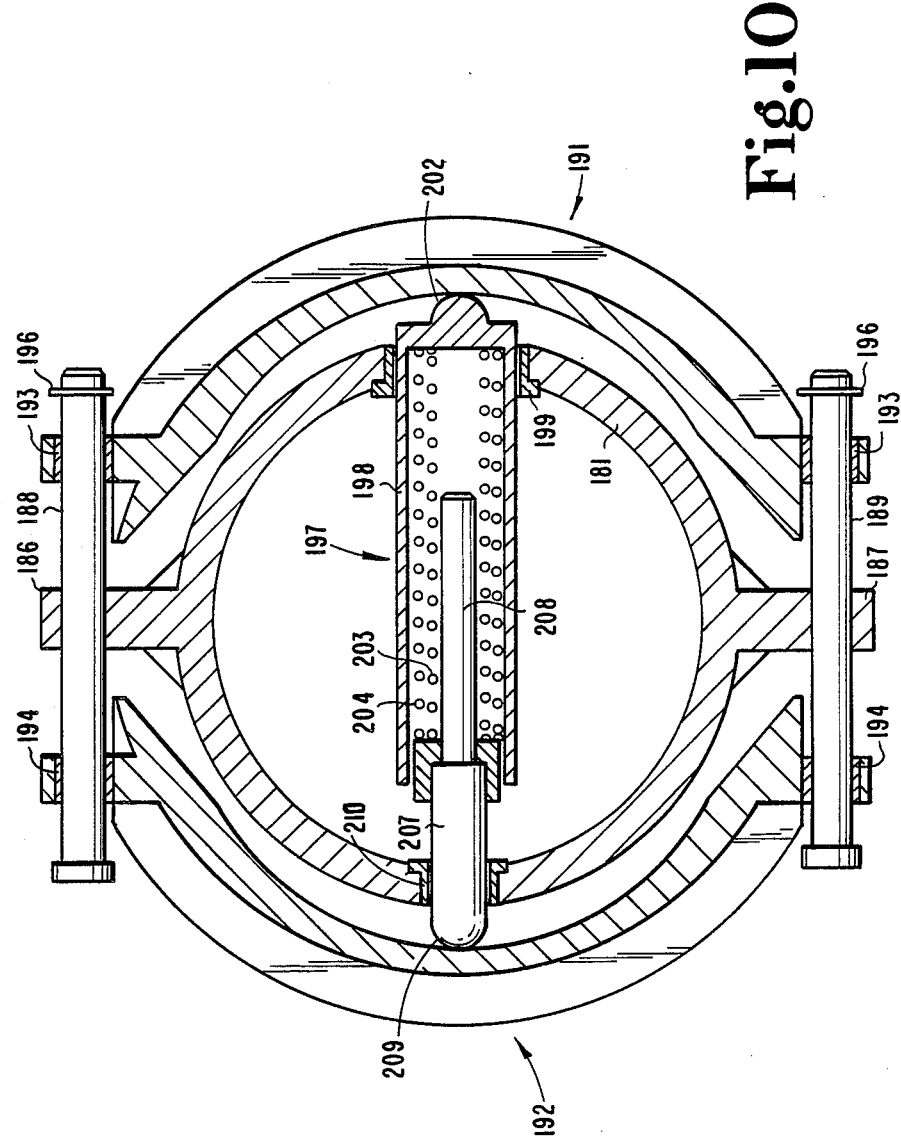
FIG. 10 is a cross section therethrough taken at line 10—10 in FIG. 9 and viewed in the direction of the arrows.

Referring now to FIGS. 9 and 10, along with FIGS. 1 and 8, the tool adaptor 76 is shown. It has a generally cylindrical body 181 with a conical upper end 182 shaped to fit the conical wall 146 of the socket in the robotic adaptor. Two key-receiver and guide grooves 183 (only one being shown) are provided in wall 182 near the top 184 of the tool adaptor and are located to receive the guide keys 147 of the robotic adaptor. Two ribs 186 and 187 projecting outward from the body 181 serve to mount guide pins 188 and 189 which are affixed to these ribs. Two shells, 191 and 192, of wear resistant material each having bearing sleeved tabs on opposite ends thereof, are slidably received on these guide posts. The shell 192 is movable radially outward from the body axis until the tabs 194 are stopped on the heads of the pins 188 and 189. The shell 191 is movable outwardly until the tabs 193 on the opposite ends thereof are stopped by stop rings 196 in grooves at the opposite ends of the posts.

Outward bias on the shells is established and maintained by a die spring assembly 197 including a spring container 198 slidably received in a bearing sleeve 199 secured in an aperture in the wall 181. The container has a spherical boss 202 at its base. The inside of the container base serves as the seat for one end of each of the inner and outer die springs 203 and 204, respectively. A block 206 serves as a seat for the opposite ends of the springs and also serves as a seat for the bearing pin 207 which has a guide stem 208 received through the center of the inner spring 203, and a rounded outer end 209 engaged witht he inner wall face of shell 192 as the rounded end boss 202 of the spring container 198 engages the inner wall face of the shell 191. The outer end portion of the pin 207 is slidably received in the bushing 210 secured in the body 181 of the tool adaptor. The inner faces of shells 191 and 192 have the same radius as the cylindrical wall 181A of the adaptor body so the shells can stop and seat on the body when being squeezed by the grippes during a tool changing operation.

Figure 13A:
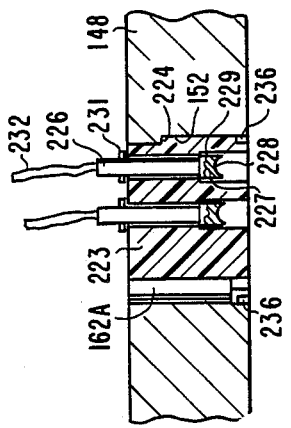
FIG. 13A is a fragmentary sectional view through a portion of the top of the effector adaptor showing some details of the five pin high power electrical connector assembly therein for supplying power to the tool adaptor.

Referring now to FIG. 13A, some detail of the high power electrical connector will be described. For versatility according to the concept of the present invention, various apertures in the top of the effector adaptor as shown in FIG. 7 and mentioned above, are adapted to receive inserts. The nature of the insert depends upon the function to be performed at that particular aperture. In the illustrated example, the aperture 152 is for a high power electrical connector and receives an insert 223 of an electrical insulating material such as Teflon, for example, which is inserted from the cavity 145 and stopped at the shoulder 224. Sine this is for a five pin connector, insert 223 has five apertures through it, one in the center and four around it. They receive five electrical contact pins such as 226. Each of these pins has a head 227 with a concave lower face shown at 228 where the pin is shown partially sectioned to show the concave shape, the head being seated on a shoulder 229 in the insert 223. The pin is prevented from falling out of the hole in the insert by a stop ring 231 received in a groove in the pin. The upper end of the pin is connected to the appropriate electrical cable 232. Anti-turn and securing spring pin 162A is shown in position at the periphery of the insert.

Figure 13B:
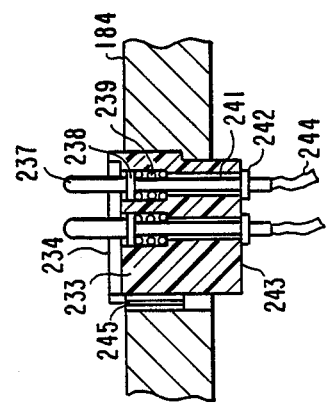
FIG. 13B is a fragmentary sectional view through a portion of the top of the tool adaptor showing details of the high power electrical conenctor assembly mounted therein and which cooperates with that of FIG. 13A when the tool adaptor is secured in the effector adaptor.

An operating counterpart pin assembly is shown in FIG. 13B where the insert 233 is received in the top 184 of the tool adaptor. An upwardly extending circumferential flange 234 of this insert is received in the peripheral notch 236 of the insert 223 when the tool adaptor is seated in the effector adaptor to provide a seal at this location and exclude dirt and any fluids which may otherwise enter in and interfere with good electrical connections.

Five round headed pins 237 are received in insert 233. Each of these pins has a circumferential flange 238 resting on a coil spring 239 which is resting on a stop shoulder in the aperture 241 in the insert. The spring urges the pin upward until it is stopped by a stop ring 242 received in a circumferential groove in the pin under the bottom 243 of the insert. An electrical conductro 244 is attached to the bottom of the pin and extends to whatever powered device such as a low current welding apparatus or a solenoid or a drive motor, for a clamp or a grinder, respectively, for example, is mounted on the tool adaptor. An anti-turn and securing spring pin may also be provided at 245 in this environment.

As the tool adaptor and effector adaptor close together, the spring loaded pins 237 engage their counterpart pins in the effector adaptor to assure reliable electrical contact at all times. Similarly, a spring-loaded, tool-in-place sensor pin like pins 237 is mounted in a small insulating insert (not shown) screwed into the central aperture 158 of the effector adaptor, with the rounded end of the pin projecting into cavity 145 below the bottom surface of the top 148 as indicated by the dotted line 158A in FIG. 8. This pin will be contacted by the center of the top 184 of the tool adaptor when it is properly and fully seated in place in the effector adaptor socket.

Figure 14A:
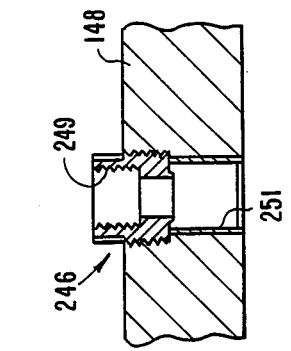
FIG. 14A is a fragmentary sectional view through a portion of the top of the effector adaptor showing a gas connector fitting secured therein.
Figure 14B:
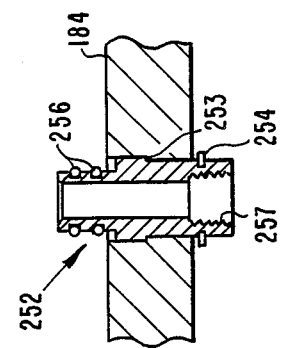
FIG. 14B is a fragmentary sectional view through a portion of the top of the tool adaptor showing the counterpart gas connector fitting which mates with that shown in FIG. 14A.

Referring now to FIGS. 14A and 14B, a fitting 246 is mounted in the effector adaptor top 148 and internally threaded at 249 to receive a gas supply tube connector, for example. Fitting 246 has a hardened sleeve 251 at the bottom thereof which receives the mating fitting 252 (FIG. 14B) which is mounted in the top 184 of the tool adaptor and retained in place between the shoulder 253 and the stop ring 254 in a groove in the fitting. The O-rings 256 seal in the liner sleeve 251 of the fitting 246 when the tool adaptor is seated in the socket of the effector adaptor. Suitable gas line fittings or tubing may be screwed into the bottom of the fitting 252 at 257. When the fittings 248 and 252 of the effector adaptor and tool adaptor, respectively, come together as the tool adaptor is seated in the socket of the effector adaptor, fluid transmission is provided as by a line 258 (FIG. 1) from the robot arm to the tool on the tool adaptor. For example, it can be air for an air motor driving a cutting or burnishing or grinding or some other tool mounted on the tool adaptor. These same fittings are useful for transfer of other gases (shielding gas or cutting gas, for example) from the effector adaptor to the tool adaptor.

Figure 15A:
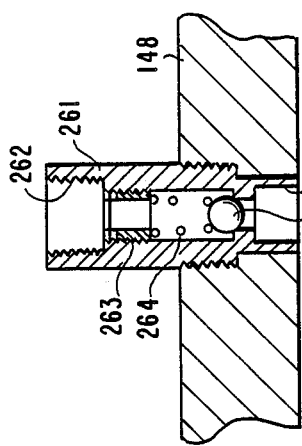
FIG. 15A is a fragmentary sectional view through a portion of the top of the effector adaptor showing the liquid return check valve assembly secured therein.
Figure 15B:
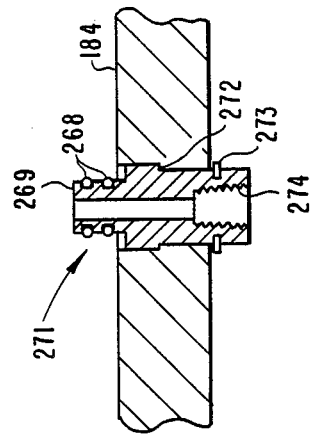
FIG. 15B is a fragmentary cross sectional view through a portion of the top of the tool adaptor and showing the water return line fitting counterpart which mates with and cooperates with that shown in FIG. 15A for transmission of water from the tool adaptor to the effector adaptor.

Referring now to FIGS. 15A and 15B, which is an example of a water return transmission assembly, a receptacle 261 is threaded into the top 148 of the effector adaptor and is internally threaded at 262 to receive a water return line as in conduit 159 (FIG. 1) to the robot. It includes a plug 263 threaded into the receptacle 261 and serving as the upper seat for the spring 264 which loads a check ball 266 which seats near the bottom of the receptacle. The plug can be turned in or out to adjust the compression of the spring. A seal wall 267 is provided below the check ball seat. This receives the O-rings 268 at the upper end 269 of the plug 271 which is received in the top 184 of the tool adaptor and seats between the shoulder 272 and the retaining ring 273 which is in an exterior groove near the bottom of this plug. The water line from the tool cooing system can be threaded into the threaded opening 274 at the bottom of this plug.

Figures 16A, 16B:
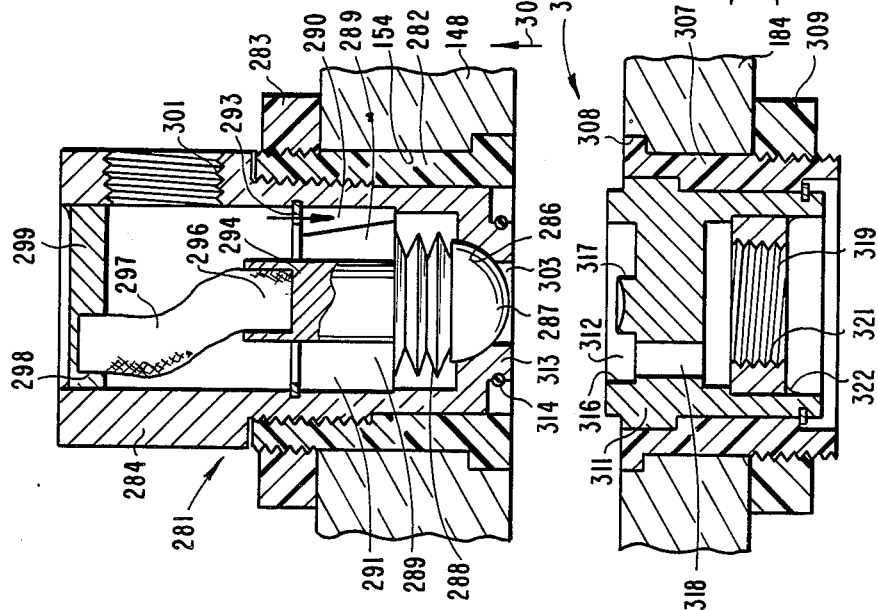
FIG. 16A is a fragmentary sectional view through a portion of the top of the effector adaptor showing the cooling water and welding current supply fitting therein.
FIG. 16B is a fragmentary sectional vew through a portion of the top of the tool adaptor showing the cooling water and welding power transmission fitting mounted therein.

Referring now to FIG. 16A, the welding power and coolant supply connector assembly 281 includes a mounting cylinder 282 inserted from cavity 145 and received int he aperture 154 in the top 148 of the effector adaptor. This cylinder is threaded at its upper end and retained in place by the lock ring 283. A valve guide and seat housing 284 is threaded into the cylinder 282. It has a spherical seat 286 near the bottom which sealingly receives the valve 287 which is biased against the seat by a Belville spring stack 288 whose upper end bears upon the lower edges of the three circularly-spaced spokes 289 of the valve stem guide 291 received in the valve guide and seat housing 284 and retained in place by a snap ring 293 in a groove in the wall of housing 284. The valve stem 294 has a well 296 in its upper end in which a flexible braided electrical cable 297 is welded, soldered or brazed or otherwise electrically and mechanically secured. Similarly, the upper end of this cable is silver soldered or otherwise electrically and mechanically secured at 298 into the downwardly opening receiver well in the contact bushing 299 permanently brazed or welded and thereby sealed in the upper end of the housing 284. A threaded opening 301 is provided in housing 284 for connection of a water-current supply line to this unit so that, upon forcing the valve 287 upward in the direction of arrow 302 so that it is off its seat, water can be supplied through the housing 284 and down through the three (one of them shown in FIG. 16A) circularly spaced apertures 290 in the valve stem guide, past the valve seat and out through the central aperture 303 at the bottom of this fitting.

The mating fitting 306 in the top 184 of the tool adaptor includes a mounting cylinder 307 having an outer flange seated in the well 308 in the top 184. It is secured in place by a lock nut 309 on the threaded lower portion of the cylinder 307. A sealing sleeve 311 is provided with a cavity 312 in the top which receives the boss 313 in the bottom of the cylinder 284 (FIG. 16A) when the tool adaptor is mounted in the effector adaptor, and the O-ring seal 314 seals on the inner wall 316. The boss 317 pushes the valve 287 off the seat permitting supply of water through the longitudinal passageway 318 in the sleeve 311 to the outlet ring 319 which is internally threaded at 321 to threadedly receive a connecting line to the cooling passageways in a torch. The ring 319 is permanently brazed or welded and thereby sealed to sleeve 311 at 322 to prevent leakage at the bottom. The parts 282, 283, 307 and 309 are made of electrical insulating material. Phenolic is an example. The features 287 and 317 are preferably made of a highly conductive and hardened copper tungsten-carbide alloy.

OPERATION

In the operation of the present inventinon as applied in the robotic system illustrated, the tool adaptors magazine would be provided with as many tool holders in the pots thereof as needed for the assortment of tools to perform the desired operations on the workpiece 13 while traveling through the work envelope 24 ont he conveyor 11. Redundancy of tools can be provided to whatever extent desired within the capacity of the tool magazine.

For removal of a tool from the magazine, the magazine is driven about axis 28 by a motor drive assembly which may be in the base as shown or in the column 29, to place the tool adaptors with the desired tool at the tool change station which is under the axis 79 of the grippers 58 and 61. The actuator 51 is then energized to close the grippers onto the shells 191 and 192 and squeeze them together against the bias supplied by the die springs 203 and 204 to remove the flanges 211 and 212 from the flange receiver groove 88 of the holder ring 84 on the magazine 27. The actuator 47 may then be energized to raise the elevator bar 43, and thereby raise the grippers 58 and 61 to lfit the tool adaptor up out of the tool pot. The vertical travel of the elevator is sufficient to raise the tool adaptor to a convenient height (ranging from one to six inches, for example) for the robot to move the effector adaptor onto the tool. The robot is moved to position its effector adaptor at the tool change station where its axis is vertically aligned with the axis 79 of the tool pot and grippers and it is then moved down onto the tool adaptor. When the tool adaptor is properly placed in the socket 145 of the effector adaptor, the tool-in-place sensor pin 158 in the threaded central aperture 158 at the top of the effector adaptor contacts the top of the tool adaptor, closing a circuit (not shown) to signal the control system that the tool adaptor is properly positioned in the effector adaptor. Then, the gripper actuator 51 is energized to spread the grippers which enables the upper flanges 213 and 214 to enter the flange groove 143 in the effector adaptor 118. The mechanical advantage of the mating tapers at the lower faces of the flanges 213 and 214 and the upper face of the bottom of the groove liner 144 will serve to overcome seating forces to properly engage all the electrical and fluid and wire apparatus during seating of the tool adaptor in the socket with the conical wall thereof engaging the conical wall 146 of the socket whereupon the flats, such as 213A on shell 213 engage and lock against the mating flat 144A on the liner. Then the robot moves the tool away to the workpiece process task. The elevator maintains the grippers high enough to clear the other tool adaptors in the magazine so the magazine can then be rotated to place another tool pot at the tool change station.

Although the robot has a certain degree of compliance, one feature of the present invention facilitates insertion of the tool adaptor into the effector adaptor with less than five pounds external unbalanced lateral force on the effector, and thereby without disturbing the position control of the robot. This feature is achieved by a combination of the pivoting action of the grippers 58 and 61 on the arms 42 and 41, respectively, the ability of the gripper 61 to move longitudinally with respect to arm 41, and the fact that both ends of actuator 51 are floating, with the inward travel of the actuator ends of the arms being limited only by the two adjustable stop assemblies 71, 72 and 73, one associated with each of the two arms 41 and 42. Hall effect sensors 216 and 217 are located in the actuator housing and serve to indicate the degree of closure of the grippers. The keys 147 in the effector adaptor, and the keyways 183 (only one shown in FIG. 9) of the tool adaptor aid in establishing the proper orientation of the tool adaptor in the effector adaptor. In other words, these parts can come together in only one correct relative rotational position.

After the tool adaptor has been secured in the effector adaptor, the welding wire pulling motor and drive wheels of conventional nature in the housing 218 on the robot arm (FIG. 1) feed wire through the tube or liner 219 and through the components 127 and 128 into the wire feed and cutter assembly or assemblies of the effector adaptor. A single wire may be used or multiple wires may be fed to these assemblies, dependent upon the goals to be obtained as briefly discussed above with reference to wire size and utilization. But where a single torch is used, only one of the wires would be fed entirely through the effector adaptor and the liner through the tool adaptor and the welding torch to extend out the end at 116 as shown in FIG. 1. (If more than one torch is mounted to the tool adaptor, wires would be fed to the additional torches simultaneously with the one.) With the welding wire extending from the tip, the robot may proceed to do its processing such as welding on the workpiece 113 as it remains in place within the work envelop or as it is moved along through the work envelope by the conveyor 11.

When the welding operation has been completed, a ball of metal may have formed at the end of the welding wire and which would prevent its withdrawal through the torch when the torch is to be placed in the magazine. If that is the case, the robot is mvoed into position over the cutter mechanism mounted to the column 29 at the tool change station. The effector assembly 21 is lowered until the welding wire 116 immediately above the ball is between the dies 113 and 114 in the cutter mechanism as shown in FIG. 4. Then the acutator 97 is energized to cut the wire, thus severing the ball from it. Then the robot may be operated to move the end effector assembly radially inward toward the robot swivel axis 26 and then lower the end effector assembly until it is in position where it can place the shells 191 and 192 in registry with the elevated grippers 58 and 61 of the gripper mechanism. Then the actuator 51 is energized to close the grippers, squeeze the shells and remove the flanges 213 and 214 from the flange groove liner 144 of the end of the effector adaptor. Then the robot arm can raise, or the elevator can be lowered (or both) to pull the tool adaptor out of the socket in the effector adaptor and place the tool in the tool pot that is in the tool change station. Upon reversing the actuation of the power actuator 51, the grippers open, the springs bias the shells and thereby the flanges 211 and 212 outward into the receiver groove at the tool pot at the change station. Thereupon, the tool adaptor is secured in the magazine and the grippers can be raised by the elevator so that the magazine can then be pivoted to place another tool pot under the grippers.

In order to prepare the effector adaptor for engagement with the next tool adaptor, the welding wire which has been pulled out of the torch of the first tool adaptor as the effector adaptor and tool adaptor are separated, is hanging from the effector adaptor. This adaptor is then raised by the robot to place the plunger buttons 119, 121 and 122 in registry with the jaws 106 and 107, respectively. Thereupon, the actuator 97 is energized to close these jaws and sever the wire at whichever one of the wire guide and cutter assemblies the wire is located. The wire will then fall away and the effector adaptor is then ready to receive the next tool adaptor, regardless of whether it has a torch, some stationary tool, some power tool, some manipulator or some other kind of tool secured to it.

In some cases, a block 107A (FIG. 4) may be substituted for the jaw 107. In that event, for cutting a welding wire it will be necessary to rotate the effector as needed to position the appropriate one of the buttons 119, 121 and 122 between jaw 106 and the block 107A to enable to actuator 97, 98 to cut the wire.

The proper orientation of the tool adaptors when they are placed in the tool pots is assured by the flats such as 221 (FIG. 1) of which there are two on each tool adaptor and which can only enter the tool pot if they match the taper of the walls 81 and 82 in the tool magazine at the tool pots.

It may be noticed that, as was mentioned above with respect to the gripper assembly, the cutter assembly also has a free floating feature, with the actuator assembly 97 floating so that the drive of the arms 93 and 92 is accommodated to balancing the force on the jaws 106 and 107.

Due to the spring loaded feature of the electrical contacts for power and communications, reliable electrical connection is assured when the tool adaptor is placed in the effector adaptor. Similarly, reliable sealing is accomplished with the gas transmission connectors employed with this invention. Of course, actual supply of gas would be controlled by control valves at the robot arm 19 where the gas used is a non-flammable shielding gas, and drifting of minor amounts through the assembly on the effector adaptor will be inconsequential and, in some instances may be desirable for functions such as to assist the separation of the adaptors, and to blow away dirt.

Due to the one-way valve assembly of the type illustrated in FIGS. 15A and 16A, the liquid control is achieved for any cooling water that may be in the supply or return line above the effector adaptor, so that it does not run out when the tool adaptor is separated from the effector adaptor.

In the above discussion of the wire feeder and cutter assembly, it was mentioned that the cylindrical boss 178 of the cutter slide 168 in FIG. 12 fits into a guide 178A in the wire feed assembly of the tool adaptor (FIG. 9). The fitting 178A is received in the top 184 of the tool adaptor and is retained from pulling out of it by a snap ring 178B. A spring wire liner 178C is secured to the bototm of the fitting 178A and extends down into a rigid tube 178D which is appropriately curved inside the tube 135 of FIG. 1 to the docking body of the torch. It thereby controls the shape of the liner 178C so that it is maintained in the proper curvature to enable the feeding of the welding wire 116 down throught he liner 178C and into the torch after the tool adaptor has been properly seated in the socket of the effector adaptor. The tube 178D is rigidly secured by any suitable means to the tool adaptor or the tool holder plate 129 which is fastened to the bottom of the tool adaptor by screws received in the threaded apertures such as at 323 in FIG. 9.

As also shown in FIG. 9, the top of the fitting 178A has slots in it such that it is castellated when the control system is arranged to provide assistance in the separation of the tool adaptor from the effector adaptor by applying a slight pressure through a line in one of the gas transfer apertures in the top 148 of the effector adaptor, but with the counterpart aperture of the tool adaptor plugged or restricted, some pressure rise can be obtained between the bottom of the top of the effector adaptor, and the top of the top of the tool adaptor to assist in separation of these parts when it is desired to remove the tool adaptor. At the same time, such pressure can be admitted through the slots in the top of the guide fitting 178A to assist in cleaning out this area and the wire liner.

In the practice of the invention, and to minimize and avoid the influence of environmental electrical phenomena, the entire tool adaptor and effector adaptor would be made of light weight material such as aluminum alloy, for example, provided with electroless nickel plating or other nickel based plating all over which provides electromagnetic shielding and surface wear resistance. This will minimize or eliminate interference with control signals through the low current, 16-pin connector which might otherwise be caused by electromagnetic disturbances in the environment.

INDUSTRIAL APPLICABILITY

From the foregoing description, the reader may recognize that the present invention provides apparatus which is well suited to tool changing functions, not only in welding robots as described, but also in other types of robotic applications, X-Y-Z processors, machining centers and other applications. Where it is applied to robots, examples of applications are in resistance welding, glueing, painting, material handling, arc welding, machining, cutting, trimming, deburring and electronic assembly applications. The apparatus can be applied where the tools are grinders, drills, mills, cutters, deburring machines or other powered devices. It may be used with various types of measuring equipment. It may increase the utility of robots in clean-room applications where only the tool change station has to be in the clean area, and the rest of the system may be in the less-clean area. Therefore, the term "effector" as used in the claims herein should be understood in a broad sense, and not construed as limited to robots.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. In a system for processing a workpiece with one or more processing tools and wherein a tool is mounted on an effector for causing the tool to operate on a workpiece, the improvement comprising:
   tool mounting apparatus including a tool adaptor having means thereon for receiving and securing one of said tools thereon; and
   an effector adaptor having means thereon for attachment to said effector;
   said tool adaptor having a body that is generally symmetrical about an axis and having first and second outwardly projecting flanges mounted on said body and projecting in directions radially outward from said axis and located on opposite sides of said axis;
   said effector adaptor having a groove receiving said flanges whereby said tool adaptor is secured to said effector adaptor;
said flanges being movable inward on said body relative to said axis to remove the flanges from the groove and thereby enable separation of the tool adaptor from the effector adaptor, and said flanges being biased outwardly from said axis and movable outward from said axis to securely re-engage said flanges in said groove and thereby again secure the tool adaptor to said effector adaptor.

2. The improvement of claim 1 and further comprising:
   first and second flange shells;
   guide posts connecting said flange shells to said body;
   springs biasing said shells outward from said axis, said shells being slidably movable on said posts,
   said first and second flanges being located on said first and second shells, respectively.

3. In a system for processing a workpiece with one or more processing tools and wherein a tool is mounted on an effector for causing the tool to operate on a workpiece, the improvement comprising:
   tool mounting apparatus including a tool adaptor having means thereon for receiving and seuring one of said tools thereon;
   an effector adaptor having means thereon for attachment to said effector;
   said tool adaptor having a body that is generally symmetrical about an axis and having first and second outwardly projecting flanges mounted on said body and projecting in directions radially outward from said axis and located on opposite sides of said axis;
first and second flange shells;
guide posts connecting said flange shells to said tool adaptor body;
springs biasing said shells outward from said axis, said shells being slidably movable on said posts,
said first and second flanges being located on said first and second shells, respectively;
said effector adaptor having a groove receiving said flanges whereby said tool adaptor is secured to said effector adaptor; and
a tool change apparatus including:
a base;
gripper mounts on said base and movable thereon;
grippers attached to said gripper mounts; and
a power actuator attached to said gripper mounts and operable, when energized, to force said grippers toward each other for engagement of said grippers with said flange shells when said shells are in positions of registry with said grippers, and squeeze said shells toward each other to withdraw said flanges from said effector adaptor groove and thereby release said tool adaptor from said effector adaptor.

4. The improvement of claim 3 wherein:
said power actuator is double acting to urge said grippers apart to enable placement of said grippers to said positions of registry with said shells.

5. The improvement of claim 3 wherein:
said power actuator includes a first member connected to one of said gripper mounts and second member connected to the other of said gripper mounts.

6. The improvement of claim 5 and wherein:
said gripper mounts are elongate arms, each arm having a central portion pivotally attached to said base, each arm having one of said grippers attached to one end of said arm, and
each arm having one or the other of said first and second members connected to the other end of said arm.

7. The improvement of claim 6 wherein:
said first and second members both move in space,
one of said grippers is longitudinally movable on one of said arms, and
a positioning spring is mounted on said one arm and biases said one gripper toward a stop.

8. The improvement of claim 7 wherein:
said grippers are pivotally mounted to said gripper mounts.

9. The improvement of claim 3 and further comprising:
a gripper elevator including a second power actuator having a first component connected to said base and a second component supporting said gripper mounts and operable to drive said gripper mounts in a direction generally perpendicular to the direction of movement of said grippers toward each other.

10. The improvement of claim 9 wherein:
said gripper elevator includes first and second mounting brackets fixed to said base;
a pair of guide posts fastened to said brackets, said first component being mounted on said second bracket,
an elevator bar slidably mounted to said guide posts, said second component being connected to said bar, and
said gripper mounts being mounted to said bar.

11. The improvement of claim 10 wherein:
said gripper mounts are arms pivotally mounted to said bar.

12. The improvement of claim 3 and further comprising:
wire cutter operating arms mounted on said base, and
a second power actuator connected to said arms; and
first and second jaws so mounted on said base as to receive said tool adaptor therein.

13. The improvement of claim 12 and further comprising:
first and second wire cutter dies on said arms and closeable together by said second power actuator to cut welding wire when disposed between said dies.

14. The improvement of claim 12 wherein said effector adaptor includes:
a welding wire shearing assembly including a first welding wire guide and support die,
first welding wire guide and shearing dies plunger, and
at least one of said jaws is registrable with said plunger and operable by said second power actuator to drive said plunger in wire cutting direction to sever welding wire extending through said effector adaptor.

15. The improvement of claim 14 and further comprising:
second and third shearing assemblies on said effector adaptor like the first-mentioned shearing assembly,
said shearing assemblies being circularly spaced on said effector adaptor and the plungers being registrable with said jaws for substantially simultaneous actuation by said second power actuator to cut welding wire extending through any of said shearing assemblies.

16. The improvement of claim 12 wherein said tool adaptor incldues:
a plurality of welding wire guides therein having axes generally parallel to said body axis;
a plurality of wire shearing dies associated with said wire guides;
a plurality of die driving plungers associated with said dies and drivable radially inward toward said body axis to sever welding wire extending through an associated one of said guides.

17. The improvement of claim 16 wherein:
said guides and plungers are circularly spaced around said body axis about 120 degrees apart.

18. The improvement of claim 3 wherein the effector is on a robot arm whereby the tool is given an operating envelope, the improvement further comprising:
a tool storage magazine having a plurality of tool pots for tool adaptors, a portion of said tool change apparatus and a portion of said magazine including one of said tool pots being cooperable inside a reserved volume of said operating envelope to establish a tool change station, said magazine being operable to move various one of said tool pots to and from said tool change station.

19. The improvement of claim 18 wherein:
said magazine is arranged whereby only one of said tool pots is in said operating envelope at a time, each of said tool pots having a flange receiving groove to receive a flange of one of said tool adaptors and secure said tool adaptor to said magazine.

20. The improvement of claim 19 wherein:
said tool adaptor has third and fourth outwardly projecting flanges axially spaced from said first and second flanges and receivable in said receiving grooves of said tool pots to secure its tool adaptor in a selected one of said tool pots.

21. In a system for processing a workpiece with one or more processing tools and wherein a tool is mounted on an effector for causing the tool to operate on a workpiece, the improvement comprising:
tool mounting apparatus including a tool adaptor having means thereon for receiving and securing one of said tools thereon;
an effector adaptor having means thereon for attachment to said effector;
said tool adaptor and effector adaptor being removably attached together;
said tool adaptor having a top wall with a plurality of apertures therein for fluid communication fittings; and
said effector adaptor having a top wall with a plurality of apertures therein for fluid communication fittings to mate with fittings in said tool adaptor for transfer of fluids through said adaptors;
first additional apertures in the top wall of said tool adaptor, for electrical connectors;
second additional apertures in the top wall of said effector adaptor for electrical connectors arranged to mate with electrical connectors in the tool adaptor for providing electrical power channels through said adaptors.

22. The improvement of claim 21 wherein:
said tool adaptor and said effector adaptor are nickel-based plated for electromagnetic shielding.

23. The improvement of claim 21 and further comprising:
fluid transfer fittings in at least one of said apertures in each of said top walls, the fitting in one top wall being in registry with a fitting in the other of said top walls for mating therewith when said adaptors are secured together to transfer fluid through a sealed passage through said adaptors,
the fitting in the effector adaptor including a check valve oriented in a direction to prevent flow from said effector adaptor toward said tool adaptor when said tool adaptor is separated from said effector adaptor, the fitting in the tool adaptor having a top and having a projection in the top thereof aligned with the check valve and operable against the check valve when the tool adaptor is secured in the effector adaptor to hold the check valve open and permit fluid flow from the effector adaptor through the fitting in the effector adaptor and through the tool adaptor fitting and make positive reliable high current electrical power connection between the check valve and the tool adaptor fitting; and
a flexible electrical conductor secured at one end in an end of the check valve and secured at an opposite end in a stationary part of said fitting in the effector adaptor and electrically insulated from said effector adaptor, to enable movement of the check valve relative to the effector adaptor as the tool adaptor is secured to the effector adaptor and maintain reliable electrical conduction of high currents from the fitting in the effector adaptor to the mating fitting in the tool adaptor.

24. The improvement of claim 23 and wherein:
said fittings have cooperating bosses and cavities with sealing means therein cooperating to provide a sealed conduit through said adaptors when said adaptors are secured together.

25. The improvement of claim 21 and further comprising;
an additional aperture in said effector adaptor; and
a tool-in-place switch button at said additional aperture for contacting the top of said tool adaptor and operating a switch to indicate when said adaptors are properly secured together.

26. In a system for processing a workpiece with one or more processing tools and wherein a tool is mounted on an effector for causing the tool to operate on a workpiece, the improvement comprising:
tool mounting apparatus including a tool adaptor having means thereon for receiving and securing one of said tools thereon;
an effector adaptor having means thereon for attachment to said effector;
said tool adaptor and effector adaptor being removably attached together;
said tool adaptor having a wall with an aperture therein for fitting means for fluid communication therethrough; and
said effector adaptor having a wall with an aperture therein for fitting means for fluid communication therethrough, said apertures being so located in said tool adaptor and in said effector adaptor for said fitting means of said effector adaptor to mate with said fitting means of said tool adaptor when said tool adaptor is attached to said effector adaptor for controlled transfer of fluid through said adaptors;
first fitting means mounted in said aperture in said tool adaptor and electrically insulated from said tool adaptor for conducting fluid and electricity through said aperture therein;
second fitting means mounted in said aperture in said effector adaptor and electrically insulated from said effector adaptor and arranged to mate with said first fitting means when said tool adaptor is attached to said effector adaptor for providing a fluid flow path from said effector adaptor to said tool adaptor and for providing an electrical power path through said apertures and insulated from said adaptors.

27. The improvement of claim 26 and wherein:
said second fitting means in the effector adaptor includes a check valve oriented in a direction to prevent flow from said effector adaptor toward said tool adaptor when said tool adaptor is separated from said effector adaptor.

28. The improvement of claim 27 wherein:
said first fitting means has a projection in the top thereof aligned with the check valve and operable when the tool adaptor is secured in the effector adaptor to hold the check valve open and permit fluid flow from the effector adaptor through the said second fitting means in the effector adaptor and through the said first fitting means in the tool adaptor.

29. The improvement of claim 28 and further comprising:

a flexible electrical conductor secured at one end to an end of the check valve and secured at an opposite end in a stationary part of said second fitting means and electrically insulated from said effector adaptor.

30. The improvement of claim 29 and wherein:

said fitting means have cooperating bosses and cavities with sealing means therein cooperating to provide a sealed conduit through said adaptors when said adaptors are secured together.

31. The improvement of claim 26 and further comprising:

an additional aperture in said effector adaptor; and a tool-in-place signal means at said additional aperture for indicating when said adaptors are properly secured together.

* * * * *